(12) United States Patent
Xu

(10) Patent No.: US 11,169,051 B2
(45) Date of Patent: Nov. 9, 2021

(54) OPTICAL TESTING DEVICES AND RELATED METHODS

(71) Applicant: AFL Telecommunications LLC, Duncan, SC (US)

(72) Inventor: Fang Xu, Auburndale, MA (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 16/790,225

(22) Filed: Feb. 13, 2020

(65) Prior Publication Data

US 2021/0255056 A1     Aug. 19, 2021

(51) Int. Cl.
| | |
|---|---|
| *G01M 11/00* | (2006.01) |
| *H04B 10/071* | (2013.01) |
| *G01M 11/02* | (2006.01) |
| *H04B 10/073* | (2013.01) |

(52) U.S. Cl.
CPC ........ *G01M 11/31* (2013.01); *G01M 11/0207* (2013.01); *G01M 11/3136* (2013.01); *H04B 10/071* (2013.01)

(58) Field of Classification Search
CPC .......................... H04B 10/071; H04B 10/073; H04B 10/0731; G01M 11/02; G01M 11/0207; G01M 11/30; G01M 11/31; G01M 11/3109; G01M 11/3136; G01M 11/3145; G01M 11/3154; G01M 11/3163; G01M 11/3172; G01M 11/3181; G01M 11/319; G01M 11/33; G01M 11/331; G01M 11/332; G01M 11/333; G01M 11/334; G01M 11/335; G01M 11/336; G01M 11/337; G01M 11/338; G01M 11/39

USPC ........................................................ 356/73.1
See application file for complete search history.

(56) References Cited

U.S. PATENT DOCUMENTS

| | | | |
|---|---|---|---|
| 7,373,069 B2 * | 5/2008 | Lazo ....................... | G01M 11/30 385/134 |
| 7,808,621 B2 * | 10/2010 | Russell ................ | G02B 6/4482 356/73.1 |
| 9,184,833 B2 * | 11/2015 | Kassler .............. | G01M 11/3154 |
| 9,360,392 B2 * | 6/2016 | Benjamin .......... | G01M 11/3145 |
| 9,709,460 B2 * | 7/2017 | Leblanc .............. | G01M 11/3145 |
| 10,862,582 B1 * | 12/2020 | L'Heureux .......... | H04B 10/035 |
| 10,969,302 B1 * | 4/2021 | Xu ....................... | G01M 11/3109 |
| 11,047,766 B2 * | 6/2021 | Eddy et al. ........ | G01M 11/3136 |
| 2016/0337034 A1 * | 11/2016 | Ruchet ............... | H04B 10/2581 |
| 2020/0209106 A1 * | 7/2020 | Parkin ................ | G02B 6/02076 |

* cited by examiner

*Primary Examiner* — Gordon J Stock, Jr.
(74) *Attorney, Agent, or Firm* — Dority & Manning, P.A.

(57) ABSTRACT

A testing device includes a test port, a light source, a measurement element, and a controller. A method of testing an optical system with the testing device includes, and/or the testing device is configured for, measuring an unloaded reference signal when the testing device is not connected to the optical system and storing the unloaded reference signal in a memory of the testing device. The method and/or configuration also includes detecting a signal from the optical system after storing the unloaded reference signal. Based on the detected signal, it is determined that the optical system is connected to a test port of the testing device. A test of the optical system with the testing device is automatically initiated in response to determining that the optical system is connected to the test port of the testing device.

18 Claims, 11 Drawing Sheets

OPTICAL TESTING DEVICES AND RELATED METHODS

FIELD

The present disclosure relates generally to devices and methods of testing optical systems.

BACKGROUND

Testing of fiber optic cables and fiber optic networks generally requires multiple steps with different hardware, e.g., test instruments, used in different steps. Generally, a loss test is performed with a separate light source and power meter in one step and a map or trace of the fiber optic cable or network is captured with an optical time-domain reflectometer in another step.

Light source power meter methods are generally known and utilized in the fiber optics industry to measure the insertion losses of the optical fibers in fiber optic cables. Typically, a fiber optic cable, network, or other system under test may be connected between two test cables. One test cable is connected to a light source, and the other test cable is connected to a power meter. Light is transmitted from the light source through the test cables and fiber optic cable to the power meter, and the loss in an optical fiber of the fiber optic cable is determined based on the measured power at the power meter and the power measured by referencing the light source to the power meter directly.

A fiber optic network can be as short as a few meters or as long as tens of kilometers. Monitoring both ends, particularly, of multi kilometer fiber optic networks typically requires at least two people, as well as additional time and expenses associated therewith.

An optical time-domain reflectometer ("OTDR" or "device") is typically connected to one end of an optical system (e.g., cable, network, etc.) under test and transmits pulsed light signals along the fiber. The OTDR records reflected light as a function of time, called an OTDR trace or simply a trace. The trace is used by software to detect reflections, e.g., fiber backscattering, of the pulsed light signals due to discontinuities or intensity changes within the optical system, such as connectors, breaks, splices, splitters, or bends in the optical fiber, generally called events. The OTDR analyzes the detected reflected light signal with respect to time in order to locate such events along the length of the optical fiber. The results of such analysis may be output as a table of events of the optical network or system.

Typically, the optical time-domain reflectometer or other testing device must be manually connected to the system under test, e.g., directly or through a launch cable, the test must be manually initiated, and the testing device must be manually disconnected from the system once the test is complete before repeating the process with a subsequent system. In many cases, such as when testing multiple optical fibers which are part of the same cable, network, or other system, performing each of the above steps manually can be cumbersome and time-consuming. For example, when a cable containing multiple fibers is elevated above the ground on a utility pole, manually performing the several steps to test each optical fiber may be particularly challenging.

Further, optical time-domain reflectometers may be used to measure end-to-end loss of the optical system by comparing fiber backscatter levels at both ends. However, conventional methods of using an optical time-domain reflectometer to measure loss depend on the accuracy of the fiber backscatter coefficients. Therefore, conventional OTDR methods are less accurate than measuring loss using a separate light source and power meter on opposite ends of the optical system. Thus, as mentioned, complete and accurate testing of an optical system generally requires multiple steps with different test instruments used in different steps, e.g., loss testing with a light source and power meter and event tracing with an optical time-domain reflectometer.

Moreover, an OTDR trace captured on one side of the network is not a complete representation of the network under test. When light is transmitted from one section of fiber to another section, the trace can reflect the loss in addition to a backscatter coefficient of each section. To determine the true loss, an OTDR trace captured from opposite directions is needed. The true loss can then be calculated by averaging the values of the two different losses captured from both directions. However, and as previously described, this is typically more time consuming and expensive and requires people positioned at opposite ends of the network.

Accordingly, improved test apparatus and methods for optical fibers are desired. In particular, testing apparatus and methods that reduce the number of manual steps in such testing, would be advantageous.

BRIEF DESCRIPTION

Aspects and advantages of the invention will be set forth in part in the following description, or may be obvious from the description, or may be learned through practice of the invention.

In accordance with one embodiment, the present disclosure is directed to a method of testing an optical system with a testing device. The method includes measuring an unloaded reference signal when the optical system is not connected to the testing device and storing the unloaded reference signal in a memory of the testing device. The method also includes detecting a signal from the optical system. Based on the detected signal, the method determines the optical system is connected to a test port of the testing device. The method further includes automatically initiating a test of the optical system with the testing device in response to determining that the optical system is connected to the test port of the testing device.

In accordance with another embodiment, the present disclosure is directed to a testing device. The optical time-domain reflectometer includes a test port, a light source, a measurement element, and a controller. The controller is configured for measuring an unloaded reference signal when the testing device is not connected to an optical system under test and storing the unloaded reference signal in a memory of the testing device. The controller is also configured for detecting a signal from an optical system after storing the unloaded reference signal and determining that the optical system is connected to the test port of the testing device based on the detected signal. The controller is further configured for automatically initiating a test of the optical system in response to determining that the optical system is connected to the test port of the testing device.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
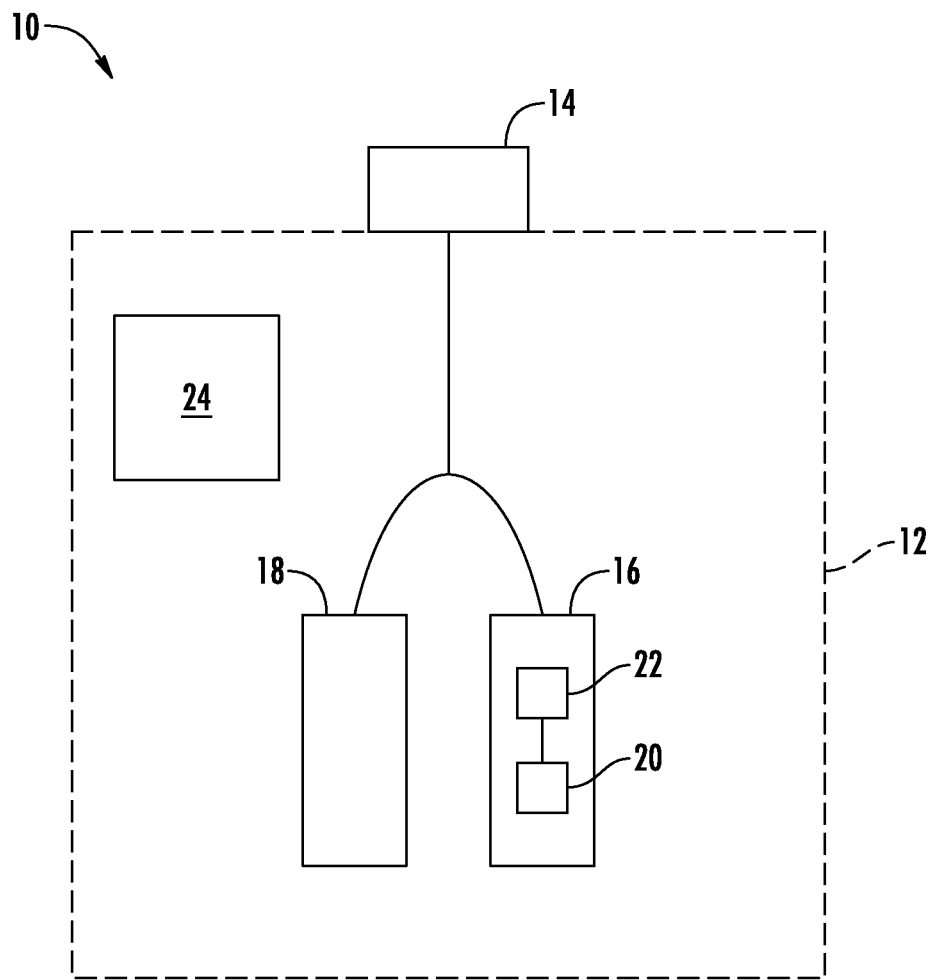
FIG. 1 provides a schematic illustration of a testing device in accordance with one or more example embodiments of the present disclosure.

Reference now will be made in detail to embodiments of the invention, one or more examples of which are illustrated in the drawings. Repeat use of reference characters in the present specification and drawings is intended to represent the same or analogous features or elements of the present invention. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and do not necessarily signify sequence or importance of the individual components. As used herein, terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

As used herein, the term "direction" refers to the direction of light travelling from the light source with respect to the media of transmission. In this regard, light travelling in a first direction includes light travelling along the media of transmission before hitting a reflector, such as a mirror, a fiber break, an open UPC connector, or even a micro structure of the transmission media itself. Light travelling in a second direction includes light travelling along the media of transmission after hitting the reflector. The "direction" does not change according to the shape of the transmission media. For instance, the direction does not change when the optical fiber is bent.

Referring now to the Figures, the present disclosure is generally directed to methods and devices which advantageously facilitate improved testing of optical systems, such as optical fibers or fiber optic networks containing multiple optical fibers. For example, the present disclosure is directed to a testing device 10, such as an optical time-domain reflectometer (OTDR), and methods of using the testing device 10 for automated testing of one or more optical systems. Referring specifically to FIG. 1, for example, the testing device 10 may include a casing or housing 12 with a light source 16 and a measurement element 18. The measurement element 18 may be configured to make a measurement of light within the optical system, for example, the measurement element 18 may be an optical power meter. In some embodiments, the light source 16 and the measurement element 18 may be disposed within the housing 12. The light source 16 and the measurement element 18 may be connected to a test port 14 by an optical branching device (which may for example include a splitter and/or other suitable apparatus, such as optical fiber couplers, circulator, etc., for providing such branching). Thus, the light source 16 and the measurement element 18 are both in optical communication with the test port 14 of the testing device 10 via the optical branching device. As illustrated for example in FIG. 1, the test port 14 may be at least partially external to the housing 12. The test port 14 may be a contact-based port or contactless port, and a suitable connector of a suitable cable as discussed herein may be connected to the port to facilitate optical coupling with the testing device 10. In at least some embodiments, the light source 16 may include a pulse generator 20 and a laser 22 which is driven by the pulse generator 20 such that the light source 16 may be operable to emit light pulses as is generally understood in the art. In some embodiments, the measurement element 18 of the testing device 10 may be an optical power meter including an avalanche photodiode, as is understood by those of ordinary skill in the art. The testing device 10 may further include a display 21 (FIG. 2) on an exterior of the housing 12.

The testing device 10 may further include a controller 24. The controller 24 may be in communication with other components of the testing device 10, including the light source 16 and the measurement element 18. Controller 24 may be configured and operable to cause such other components to perform the various operations and method steps as discussed herein.

Controller 24 may generally comprise a computer or any other suitable processing unit. For example, the controller 24 may include one or more processor(s) and associated memory device(s) configured to perform a variety of computer-implemented functions, as discussed herein. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) of the controller 24 may generally comprise local memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements including remote storage, e.g., in a network cloud. Such memory device(s) may generally be configured to store suitable computer-readable instructions that, when implemented by the processor(s), configure the controller 24 to perform various computer-implemented functions including, but not limited to, performing the various steps discussed herein. In addition, the controller 24 may also include various input/output channels for receiving inputs from and for sending control signals to the various other components of the testing device 10, including the light source 16 and the measurement element 18.

In various embodiments, the present disclosure is directed to methods of testing an optical system including one or more optical fibers, such as a fiber optic cable or a fiber optic network (e.g., a network comprising one or more cables, at least some of which are fiber optic cables) with a testing device. It should be understood that in exemplary embodiments, the controller 24 may be utilized to perform some or all of the various method steps as discussed herein.

In some exemplary embodiments, the controller 24 may be configured for and the method of testing an optical system with the testing device 10 may include measuring an unloaded reference signal when the testing device 10 is not connected to an optical system under test, for example, as shown in FIG. 1. The unloaded reference signal may also be referred to as a background signal or a no-system signal. The unloaded reference signal may be stored in a memory of the testing device 10, for example, the controller 24 may include the memory, as discussed above, and/or may be configured for storing the unloaded reference signal in the memory. The unloaded reference signal may generally include a waveform having a shape which can vary depending on the configuration of the testing device 10 and additional testing devices which may be used for connecting the testing device 10 with the system under test. For example, the unloaded reference signal waveform may vary depending on whether a jumper cable and/or an optical switch is used or not, whether a launch cord is used or not, the type of connector at the test port 14, and other variations in the configuration of the testing device 10 for interfacing with the system under test.

Figure 2:
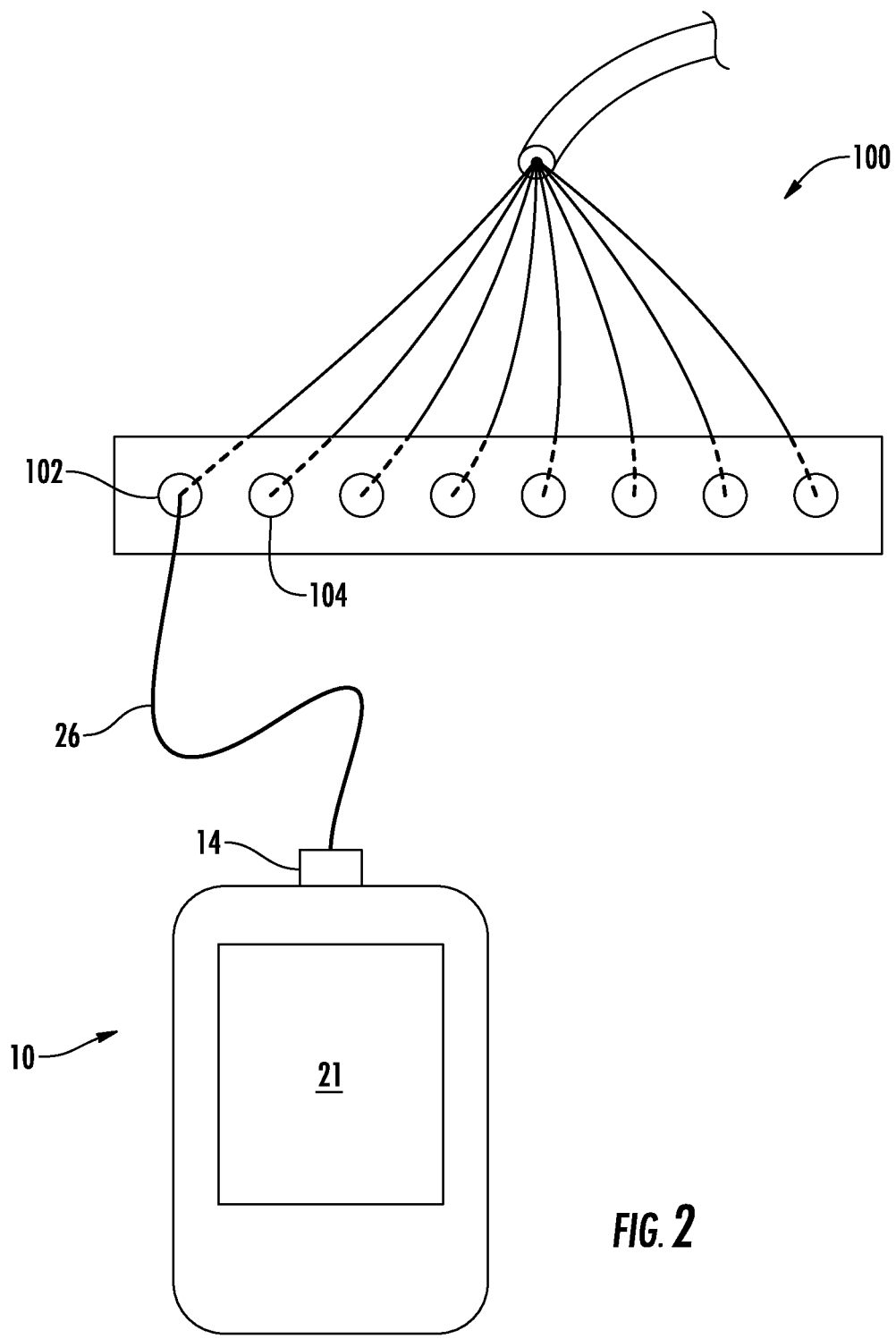
FIG. 2 provides a schematic illustration of a testing device connected to a first optical system in accordance with one or more example embodiments of the present disclosure.
Figure 3:
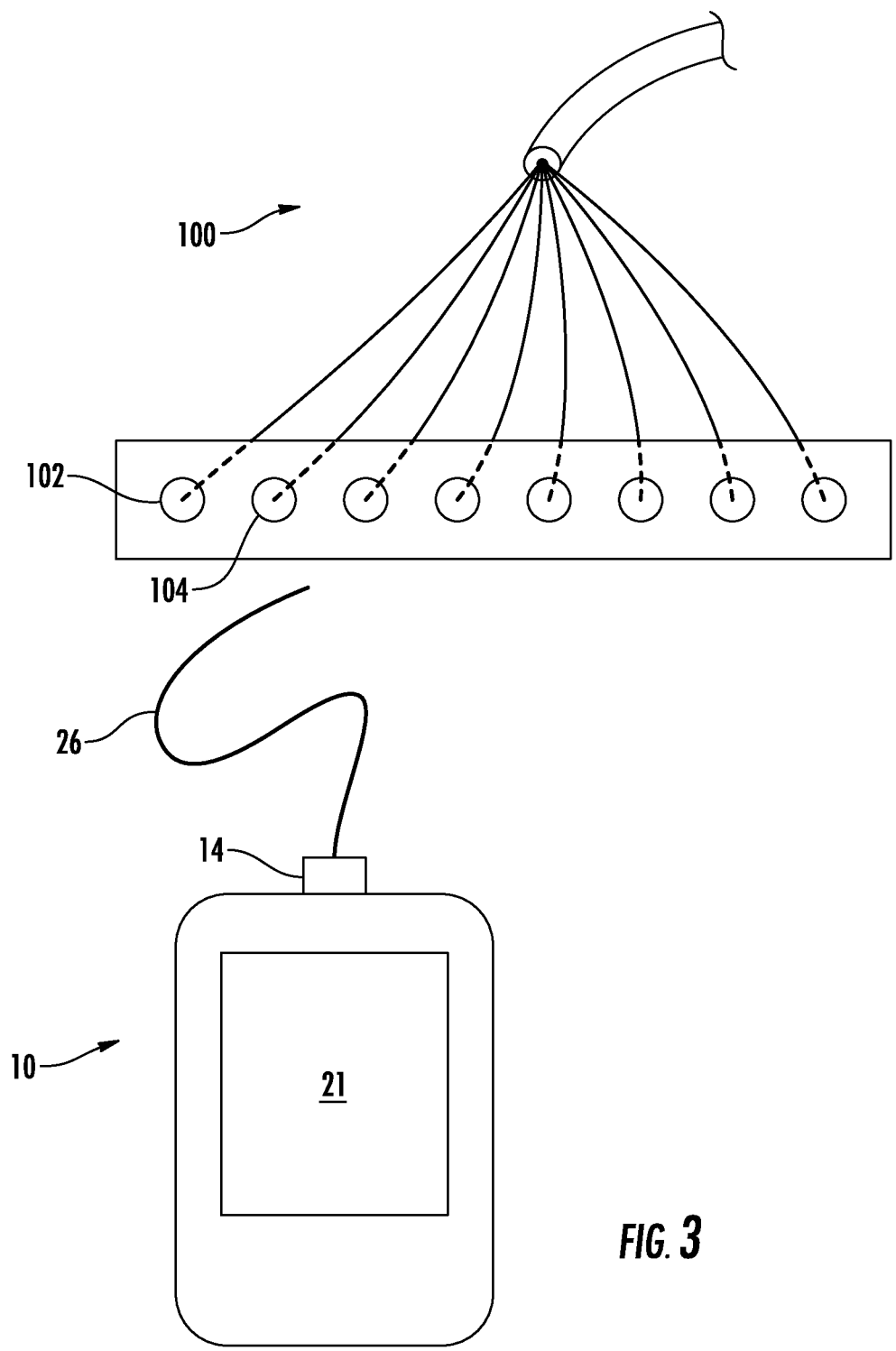
FIG. 3 provides a schematic illustration of a testing device not connected to an optical system in accordance with one or more example embodiments of the present disclosure.
Figure 4:
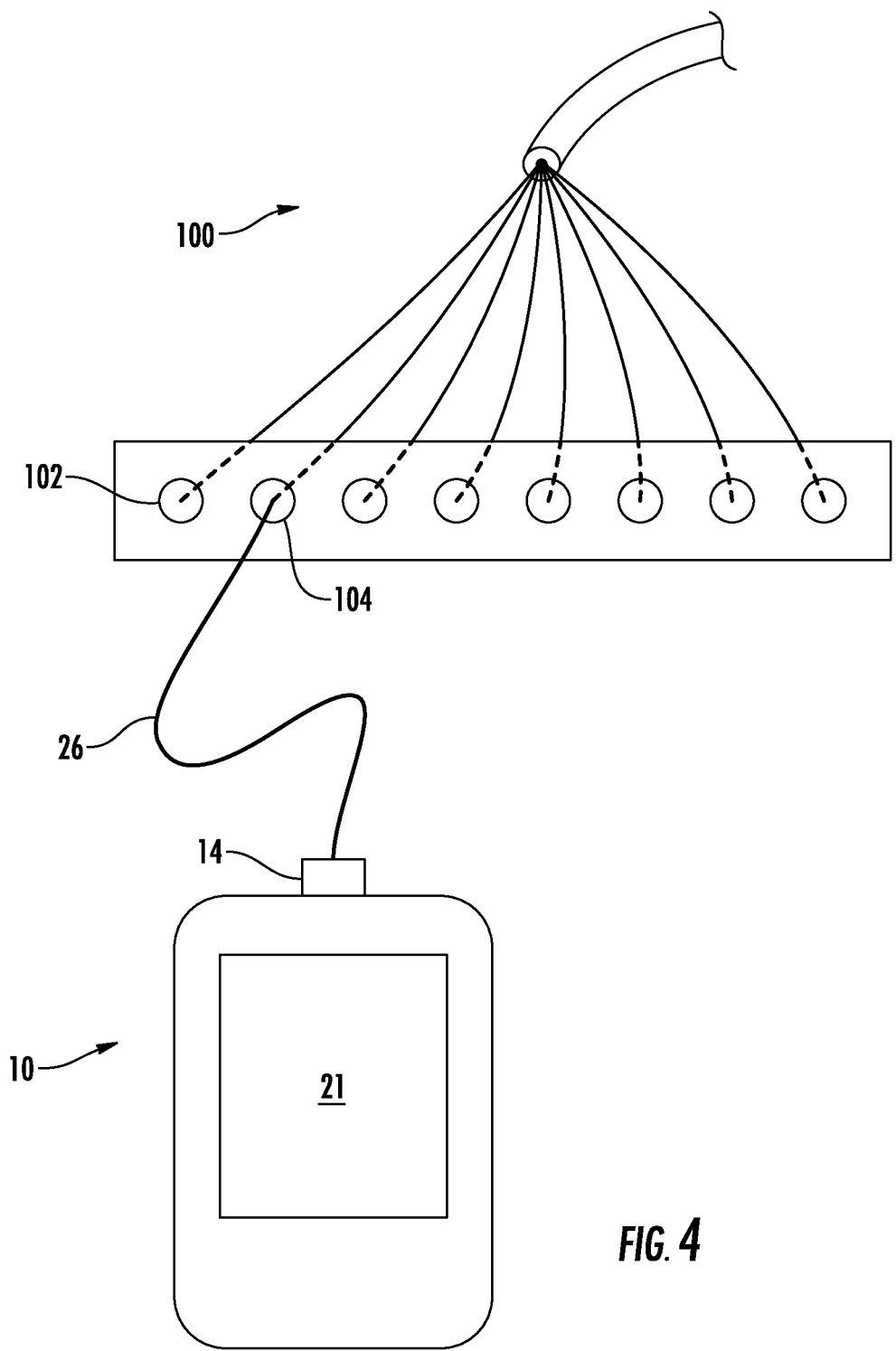
FIG. 4 provides a schematic illustration of a testing device connected to a second optical system in accordance with one or more example embodiments of the present disclosure.

The system under test 100 may be connected to the testing device 10 either directly or through a short jump cable, usually referred to as a launch cable, 26. The system under test 100 can be directly connected to the test port 14 of the testing device 10 in case no launch cable 26 is used. Once connected, the testing device 10 is configured to transmit pulsed light signals along an optical path of the optical system 100 directly or through the launch cable 26. For example, as shown in FIGS. 2 through 4 the testing device 10 may be connected to the optical system 100 via launch cable 26. In such embodiments, the unloaded reference signal or no-system signal would include the launch cable 26, e.g., the unloaded reference signal would be measured while the launch cable 26 is connected to the testing device 10 but the launch cable 26 and the testing device 10 are not connected to the system under test 100. In other embodiments, e.g., when the launch cable 26 is not used, the measured unloaded reference signal may include the testing device 10 only. Thus, while the testing device 10 may be connected to other components, such as the launch cable 26, when the unloaded reference signal is measured, the testing device 10 is not connected, directly or indirectly, to the optical system under test 100 when the unloaded reference signal is measured. Additionally, it should be understood that such other components with which the testing device 10 is connected when the unloaded reference signal is measured generally remain connected to the testing device 10 when the optical system 100 is connected, for example, when the launch cable 26 is connected to the testing device 10 during the unloaded reference signal measurement the launch cable 26 remains connected to the testing device 10 for testing, e.g., the testing device 10 will be connected to the optical system 100 via the launch cable 26.

Turning now specifically to FIG. 2, the testing device 10 may be connected to an optical system under test 100. As used herein, the term "optical system" is intended to include any one or more of several various systems which comprise at least one optical fiber. For example, an "optical system" may be an optical fiber, a cable including one or more optical fibers, or a network of cables where at least some of the cables in the network include one or more optical fibers, among other examples. In some embodiments, for example, as illustrated in FIG. 2, the system under test 100 may be a cable comprising a plurality of optical fibers therein. As indicated in FIG. 2, the plurality of optical fibers may include a first optical fiber 102, a second optical fiber 104, etc., up to and including any suitable number of optical fibers. Eight such optical fibers are depicted in FIG. 2, solely by way of example. Those of ordinary skill in the art will recognize that any suitable number of optical fibers greater or less than eight may be included, such as four optical fibers, forty-eight optical fibers, or more.

When the testing device 10 is connected to an optical system, such as the first optical fiber 102 as illustrated in FIG. 2, the testing device 10, e.g., the controller 24 thereof, may be configured for and exemplary methods may include detecting a signal from the optical system 100. For example, the signal from the optical system 100 may be detected by monitoring the test port 14 of the testing device 10 (e.g., detecting a plurality of signals) after storing the unloaded reference signal and comparing the detected signals to the unloaded reference signal. When a detected signal is sufficiently distinct from the unloaded reference signal, such detected signal may be a signal from the optical system 100.

In some embodiments, the detected signal may be a reflected optical signal from the optical system 100. For example, the testing device 10 may be configured to emit a light signal via the test port 14 after storing the unloaded reference signal in the memory, and the detected signal may be a reflection of the emitted light signal. In some embodiments, the signal is received by the testing device 10 directly from the optical system 100. For example, the detected signal may be a reflected signal in that the detected signal is a reflection of a signal emitted by the testing device 10 rather than from a separate instrument connected to the optical system 100 at a remote location, e.g., an opposite end, of the optical system 100 from the testing device. For example, the detected signal may be received by the testing device 10 directly from the optical system 100 rather than being transmitted through the optical system 100 from a separate instrument.

In some embodiments, the method of testing the optical system may further include, and the testing device 10, e.g., the controller 24 thereof, may further be configured for, determining that the optical system 100 is connected to the test port 14 of the testing device 10 based on the detected signal. For example, the testing device 10 and/or controller 24 may be configured to compare the detected signal to the stored unloaded reference signal in order to determine that the optical system 100 is connected to the testing device 10 based on a difference between the detected signal and the unloaded reference signal.

Once the testing device 10 has determined that the optical system 100 is connected to the test port 14, the testing device 10 may further be configured for, and exemplary methods may include, automatically initiating a test of the optical system 100. For example, the test may be automatically initiated in response to the detected signal, such as in response to determining that the optical system 100 is connected to the test port 14 of the testing device 10. The test may be automatically initiated in that the test is initiated without requiring an affirmative user input or command to initiate the test after the testing device 10 has determined that the optical system 100 is connected to the test port 14. For example, a user would not have to provide an affirmative input such as pushing a button or responding to a prompt, etc., on the display 21 of the testing device 10.

In some embodiments, as shown in FIGS. 2 through 4, the testing device 10 may be configured for, and/or exemplary methods of testing the optical system with the testing device 10 may include, testing multiple optical systems in succession, for example, the eight optical fibers illustrated in FIGS. 2 through 4 (which may, as mentioned above, be fewer than eight or more than eight in various embodiments). In particular, the optical system 100 referred to above may be a first optical system 102, such as the first optical fiber 102. In such embodiments, the testing device 10 may further be configured for and/or testing methods may further include completing the test of the first optical system 102 after automatically initiating the test and detecting the unloaded reference signal after completing the test of the first optical system 102. For example, the testing device 10 may be configured to provide a user notification when the test is complete, including one or more of a visual indicator such as a light (e.g., steadily illuminated and/or blinking), an audible indicator such as a beep or chime, or other suitable indicators such as haptic feedback, etc., separately or in combination.

After the test is complete, the testing device 10 may be disconnected from the first optical system 102. For example, the user may disconnect the launch cable 26 from the first optical system 102, as shown in FIG. 3. When configured as shown in FIG. 3, where the launch cable 26 and the testing device 10 are not connected to the system(s) under test, e.g., 100, 102, and/or 104, the testing device 10 may detect the unloaded reference signal, e.g., the testing device 10 may monitor the test port 14 after completing the test and compare the signals received at the test port 14 to the stored unloaded reference signal until the testing device 10 determines that the detected signal matches the stored unloaded reference signal. Upon detecting the unloaded reference signal after the automatically-initiated test is complete, the testing device 10 may thus determine that the first optical system 102 is disconnected from the test port 14 of the testing device 10.

After determining that the first optical system 102 is disconnected from the test port 14, the testing device 10 may prepare for testing the next optical system, e.g., second optical system 104. In some embodiments, the testing device 10 may be configured for continuously monitoring the test port 14 after determining the first optical system 102 is disconnected. In some embodiments, continuously monitoring the test port 14 may include emitting an optical signal from the light source 16 of the testing device 10 and monitoring for a reflection of the emitted optical signal from the second optical system 104.

In some embodiments, the testing device 10 may be configured for and exemplary methods may include detecting a signal from the second optical system 104 after determining the first optical system is disconnected from the test port 14. In some embodiments, the testing device 10 may be configured for monitoring the test port 14 after determining that the first optical system 102 is disconnected, as described above, until the signal from the second optical system 104 is detected. Once the signal from the second optical system 104 is detected, which may include comparing the detected or measured signal from the test port 14 to the stored unloaded reference signal until the measured signal is different from, e.g., greater than, the stored unloaded reference signal, it may be determined that the second optical system 104 is connected to the testing device 10. The testing device 10 may be configured for automatically initiating a test of the second optical system 104 in response to detecting the signal from the second optical system, e.g., after determining that the second optical system 104 is connected to the testing device 10.

In various embodiments, the testing device 10 may be further configured for and/or exemplary methods of testing may further include waiting for a predetermined period of time after determining that the optical system 100 (which may also be one or both of the first optical system 102 and the second optical system 104) is connected to the test port 14 before automatically initiating the test of the optical system 100, 102, and/or 104.

Figure 9:
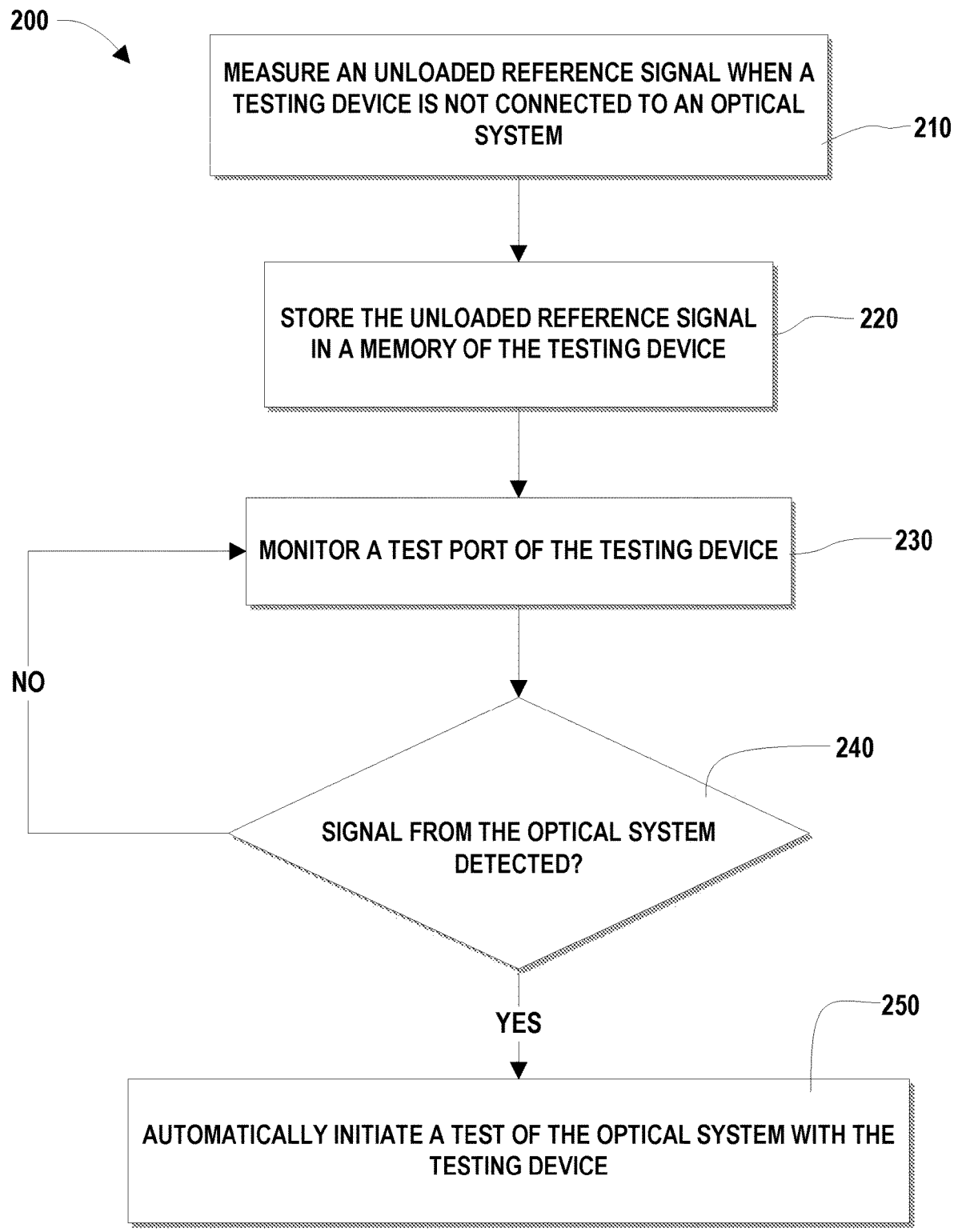
FIG. 9 provides a flowchart illustrating a method of testing an optical system with a testing device in accordance with one or more example embodiments of the present disclosure.

Turning now to FIG. 9, embodiments of the present disclosure may include methods of testing an optical system, such as one or more of the optical systems 100, 102, and 104 described above, with a testing device 10, which may, for example, be an OTDR, as described above. One example of such embodiments is the method 200 of testing an optical system with a testing device illustrated in FIG. 9. As shown, the method 200 may include a step 210 of measuring an unloaded reference signal when the testing device is not connected to the optical system and a step 220 of storing the unloaded reference signal in a memory of the testing device.

The method 200 may also include a step 230 of monitoring a test port of the testing device, e.g., after storing the unloaded reference signal in the memory. The method 200 may further include a determining step 240, e.g., of determining whether a signal from the optical system has been detected. For example, the method 200 may include monitoring the test port of the testing device, e.g., continuously or repeatedly measuring an optical signal with or at the test port of the testing device, and comparing the measured signals with the unloaded reference signal. Thus, at step 240, when the monitored signal is the same as or within a predetermined threshold or tolerance of the unloaded reference signal, it may be determined that a signal from the optical system has not been detected and therefore the optical system is not connected to the testing device. The determination at step 240 may thus be "NO," and the method 200 may then return to step 230 and continue to monitor the test port. When the monitored signal is different and/or distinct from the unloaded reference signal, the determination at step 240 may be positive, e.g., may be "YES," and it may thus be determined or inferred that the optical system is connected to the test port of the testing device based on the detected signal. The method 200 may further include a step 250 of automatically initiating a test of the optical system with the testing device in response to determining that the optical system is connected to the test port of the testing device, e.g., inferring that the optical system is connected to the testing device when the determination at step 240 is "YES." As mentioned above, such connection between the optical system and the testing device may be direct or indirect, e.g., via a launch cable.

Automatically initiating the test of the optical system with the testing device provides numerous advantages. For example, the user can begin preparing the next system (such as second optical system 104) for testing, e.g., by cleaning and visually inspecting the next system, immediately after connecting the first system 102. As another example, the user does not need to be at the same location as the instrument. For instance, the testing device 10 may be left on the ground while the user climbs a utility pole to access the systems for connection via a sufficiently long launch cable 26. The foregoing advantages are provided by way of example only and are not limitations of the invention, other advantages may also be provided as will be recognized by those of skill in the art.

Figure 10:
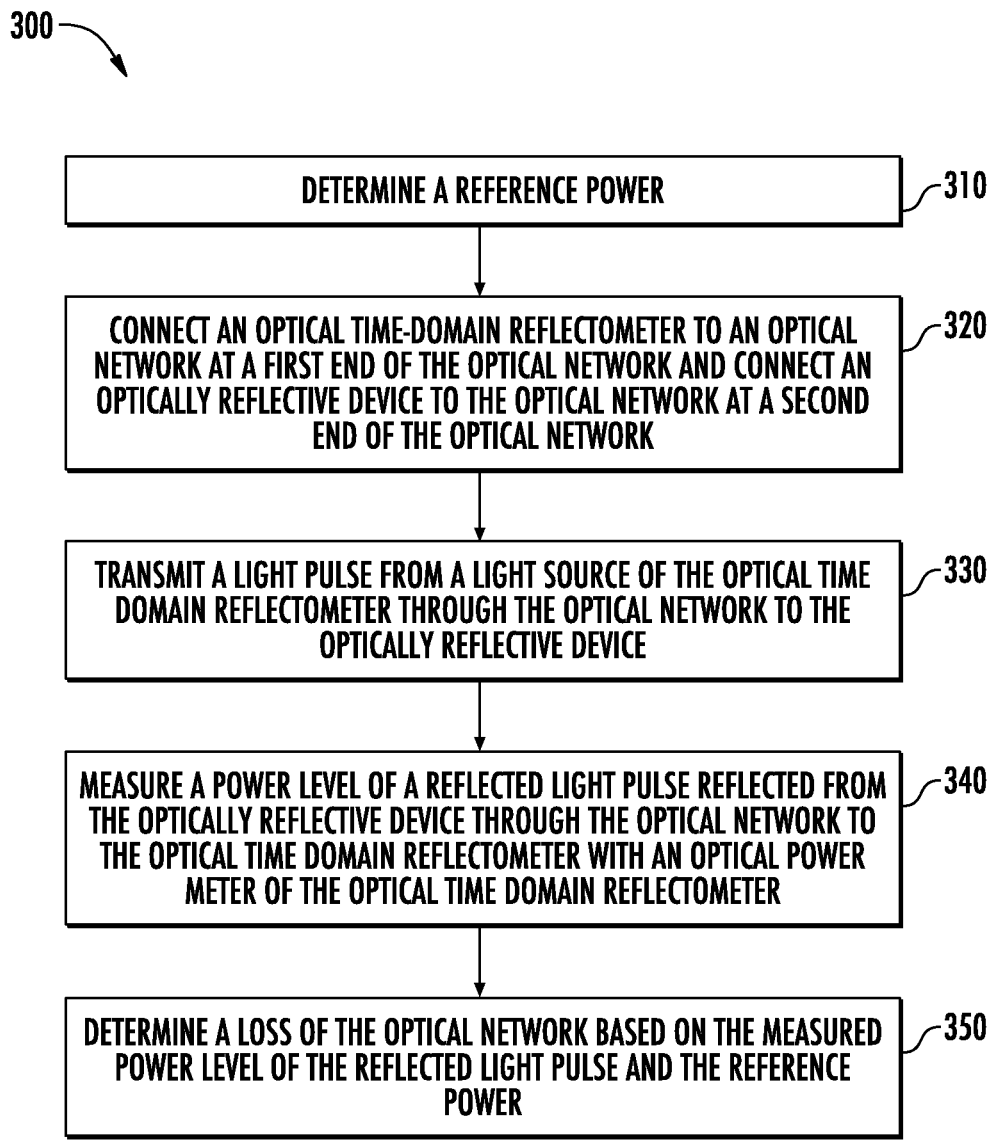
FIG. 10 provides a flowchart illustrating a method of testing an optical network with a testing device in accordance with one or more example embodiments of the present disclosure.
Figure 11:
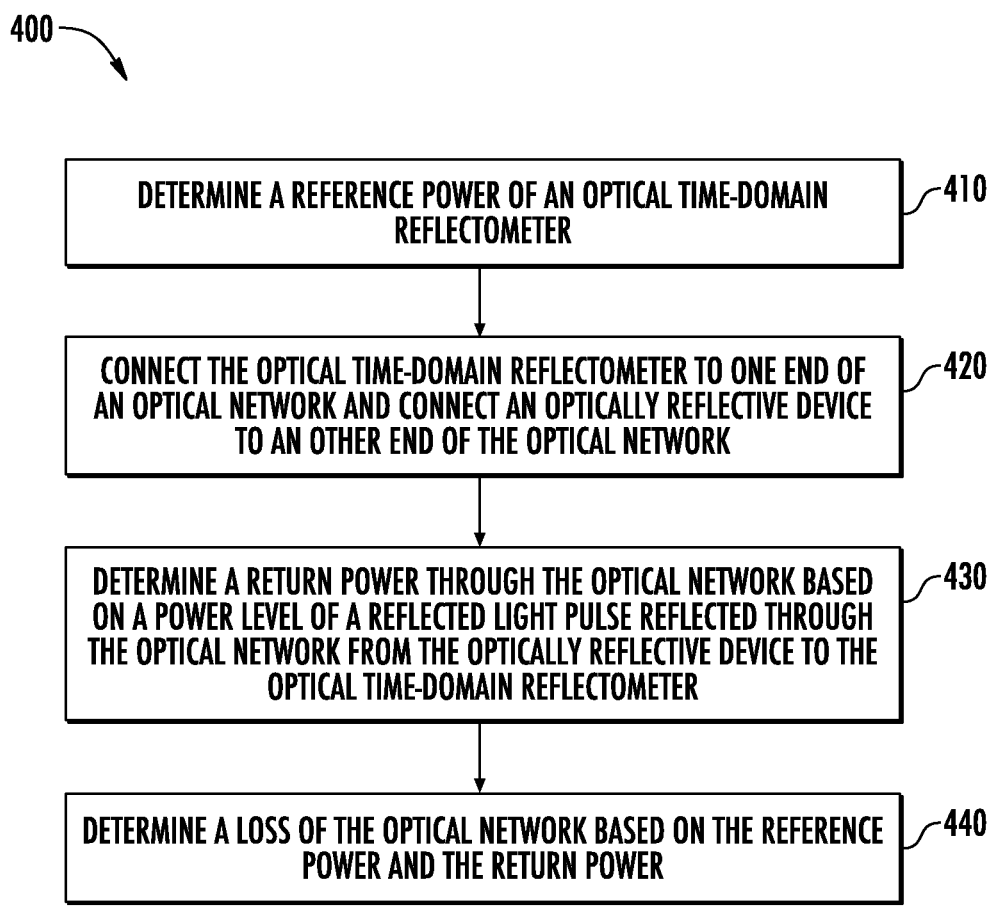
FIG. 11 provides a flowchart illustrating a method of testing an optical network with a testing device in accordance with one or more additional example embodiments of the present disclosure.

In some embodiments, the test which is automatically initiated may be or include a loss test. For example, configurations used in such loss testing are shown in FIGS. 5 through 8 and example steps of such test methods are shown in the flowcharts of FIGS. 10 and 11.

Figure 5:
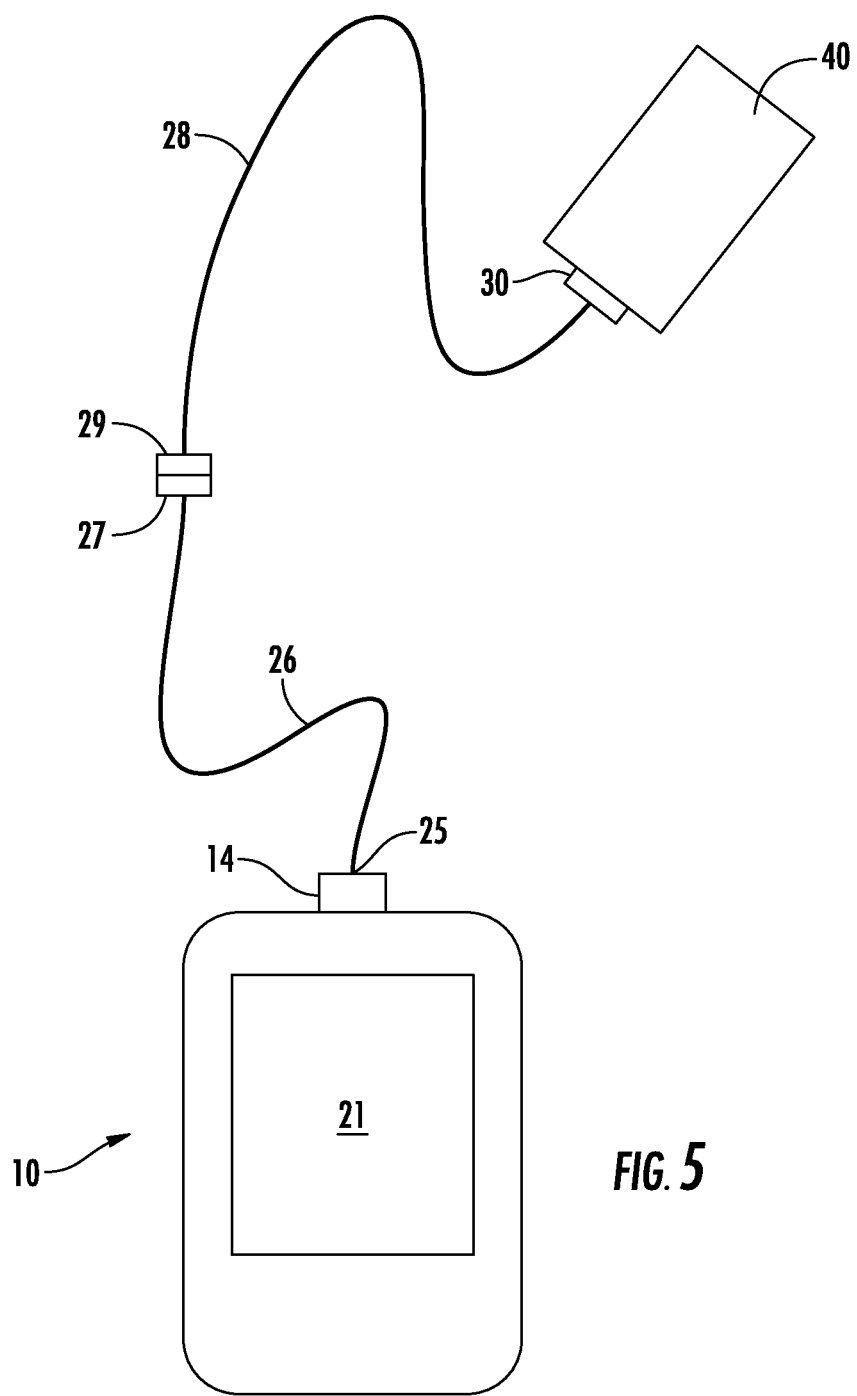
FIG. 5 provides a schematic illustration of a testing device connected to an optical reflector in accordance with one or more example embodiments of the present disclosure.

As shown in FIG. 5, the testing device 10 may be connected to an optical reflector 40 for measuring or determining a reference power after attenuation of a round trip without network under test of light emitted by the testing device 10 and received by the same testing device. In various embodiments, the optical reflector 40 may be, e.g., a mirror, an open UPC connector, or any other suitable optical reflector. The optical reflector can be reflective for all wavelengths or reflective only to selected wavelengths. The structure and function of such optical reflectors, e.g., mirrors and UPC connectors, are generally understood by those of ordinary skill in the art and, as such, are not shown or described in greater detail in the interest of clarity and brevity.

For example, the reference power may be determined when the testing device 10 is connected to the optical reflector 40, e.g., when the testing device 10 is connected to the optical reflector 40 without a network under test between the testing device 10 and the optical reflector 40. As shown in FIG. 5, the testing device 10 may be connected to the optical reflector 40 by a launch cable 26 and a receive cable 28. More specifically, a first end 25 of the launch cable 26 may be connected to the test port 14 of the testing device 10, a second end 27 of the launch cable 26 may be connected to a second end 29 of the receive cable 28, and a first end 30 of the receive cable 28 may be connected to the optical reflector 40. In particular, the first end 25 of the launch cable 26 may be directly connected to the testing device 10, the first end 30 of the receive cable 28 may be directly connected to the optical reflector 40, and the second end 27 of the launch cable 26 may be directly connected to the second end 29 of the receive cable 28.

With the testing device 10 and the optical reflector 40 so connected, the reference power of the testing device 10 may be obtained by emitting one or more light pulses into the cables 26 and 28, e.g., from the light source 16 of the testing device 10 through the test port 14 such that the light pulse(s) are transmitted from the light source 16 of the testing device 10 through the cables, e.g., launch cable 26 and receive cable 28, to the optical reflector 40, and measuring an optical power level of the reflections of such light pulse(s) from the optical reflector 40 with the measurement element 18 of the testing device 10.

Figure 6:
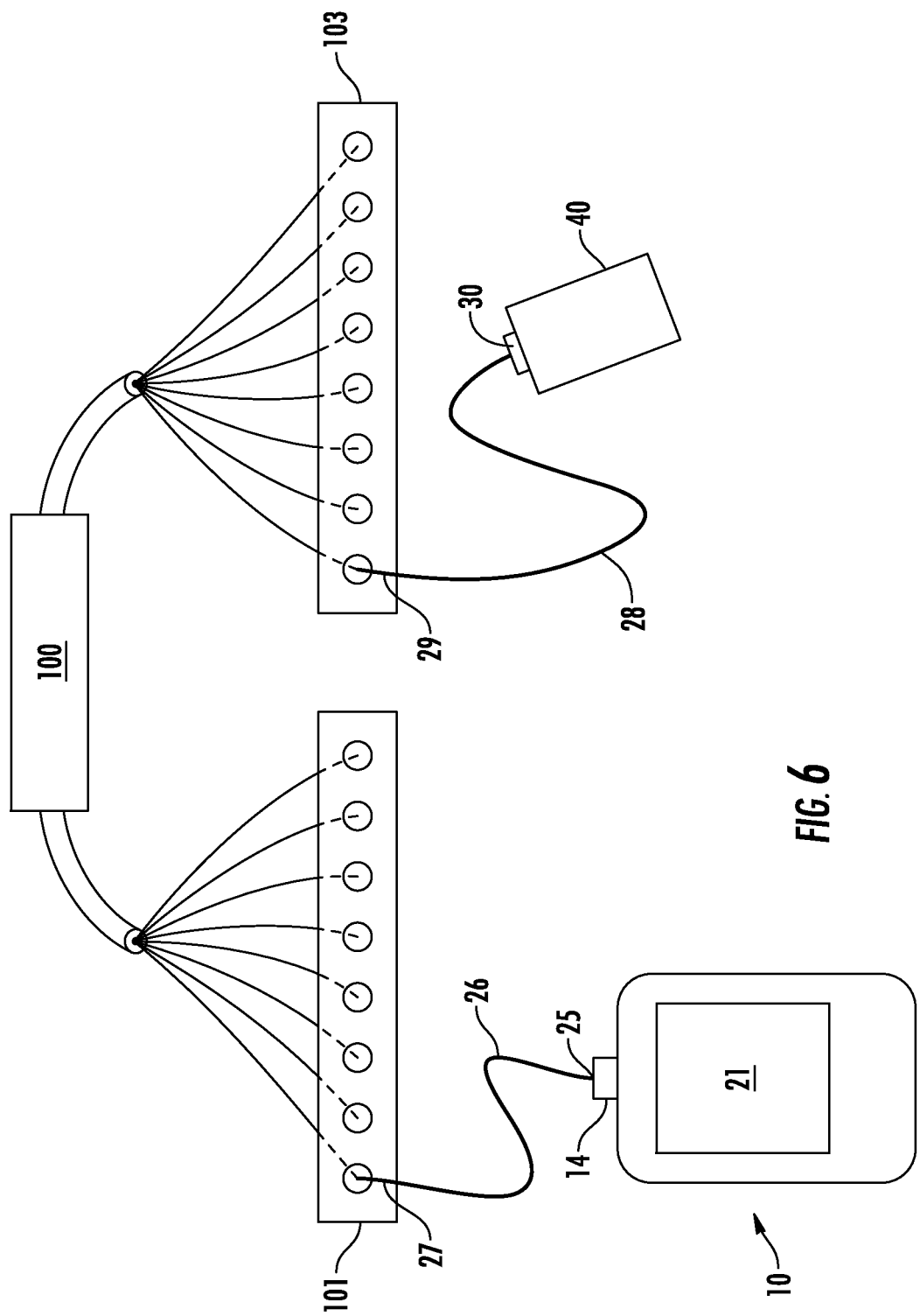
FIG. 6 provides a schematic illustration of a testing device and an optical reflector connected to an optical network in accordance with one or more example embodiments of the present disclosure.

Turning now to FIG. 6, in embodiments where the test which is automatically initiated is a loss test, the system under test 100 may be a network such as an optical network 100. As illustrated in FIG. 6, the testing device 10 may be connected to the optical network under test (sometimes abbreviated NUT) 100 at a first end 101 of the optical network 100 and the optical reflector 40 may be connected to the optical network 100 at a second end 103 of the optical network 100. For example, as illustrated schematically in FIG. 6, the first and second ends 101 and 103 of the optical network 100 may be access panels at separate locations, such as separate ends, of the optical network 100. In some embodiments, the second end 103 of the optical network 100 may be opposite the first end 101 of the optical network 100. In some embodiments, connecting the testing device 10 to the optical network 100 at the first end 101 of the optical network 100 may include connecting the second end 27 of the launch cable 26 directly to the first end 101 of the optical network 100 and connecting the optical reflector 40 to the optical network 100 at the second end 103 of the optical network 100 may include connecting the second end 29 of the receive cable 28 directly to the second end 103 of the optical network 100.

As mentioned above, the optical reflector 40 may, in various example embodiments, include a mirror or an open UPS connector. For example, in some embodiments the optical network 100 may be a high-loss network and the optical reflector 40 may be a mirror. As another example, in other embodiments, the optical network 100 may be a low-loss network and the optical reflector 40 may be an open UPC connector. It should be understood that, as used in the foregoing, the relative terms "high-loss" and "low-loss" are used with reference to one another.

With the testing device 10, the optical reflector 40, and the optical network 100 configured and arranged, e.g., interconnected, as illustrated in FIG. 3, a return power may be obtained, e.g., the return power through the optical network 100 may be measured or determined when the testing device 10 and the optical reflector 40 are connected to the optical network 100 as shown in FIG. 6. As is generally understood in the art, the return power may include a measured power level of a reflected light pulse returned to the testing device 10 through the optical network 100 by the optical reflector 40.

In various embodiments, determining the return power may include transmitting one or more light pulses from the light source 16 (FIG. 1) of the testing device 10 through the optical network 100 to the optical reflector 40, and measuring a power level of one or more reflected light pulses reflected from the optical reflector 40 through the optical network 100 to the testing device 10 with the measurement element 18 (FIG. 1) of the testing device 10.

Once the reference power has been obtained, e.g., using the configuration shown in FIG. 5 and described above, and the return power has been obtained, e.g., using the configuration shown in FIG. 6 and described above, the loss of the optical network 100 may be determined based on the reference power and the return power. For example, the loss of the optical network 100 may be based on a difference (ΔP) between the reference power and the return power. For example, in some embodiments, ΔP may be determined by subtracting the return power from the reference power. In some embodiments, the loss of the optical network 100 may be determined by subtracting the return power, e.g., the measured power level of the reflected light pulse, from the reference power and dividing the result of subtracting the measured power level of the reflected light pulse from the reference power by two. In such embodiments, the loss of the optical network 100 may also be expressed mathematically as:

$$\text{Loss of NUT} = \tfrac{1}{2} \cdot \Delta P$$

Additionally, in at least some embodiments, a trace of the optical network 100 may also be captured using the testing device 10, e.g., the test which is automatically initiated may include tracing the optical system 100, e.g., the optical network 100 of FIGS. 5 through 8, either as a stand-alone test or the trace may be captured after determining the loss of the optical network 100. For example, the trace of the optical network 100 may be captured using the testing device 10 without disconnecting the testing device 10 from the optical network 100. Methods of capturing a trace of an optical network with a testing device, such as an optical time-domain reflectometer, are generally understood by those of ordinary skill in the art and, as such, are not described in greater detail herein. Nonetheless, it should be appreciated that testing methods according to the present disclosure may be advantageous in that the trace can be captured and a loss of the optical network can be determined using a single device, e.g., testing device 10, without the need to connect and disconnect multiple test instruments, e.g., without a separate light source and power meter for loss testing.

Figure 7:
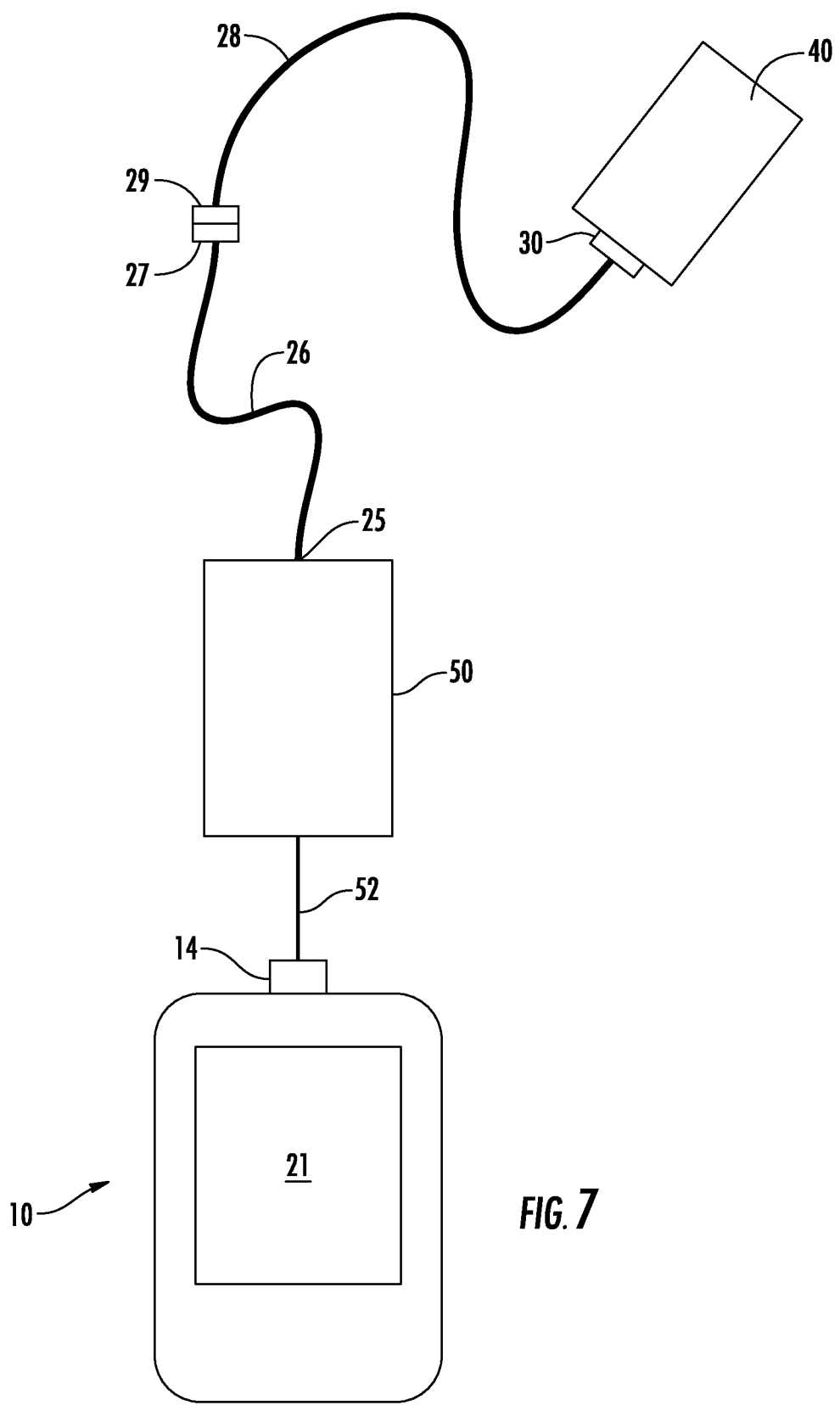
FIG. 7 provides a schematic illustration of a testing device connected to an optical reflector in accordance with one or more additional example embodiments of the present disclosure.
Figure 8:
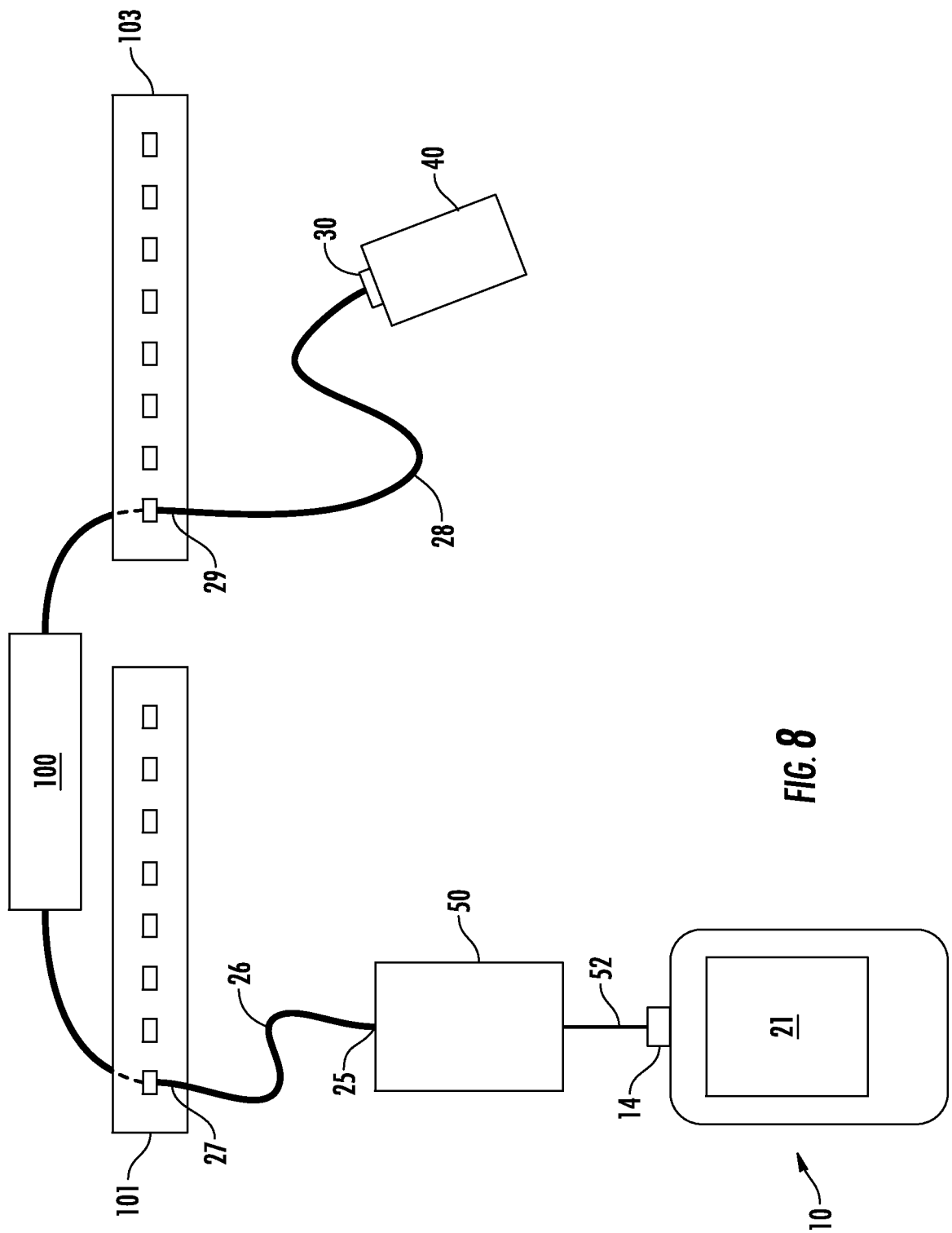
FIG. 8 provides a schematic illustration of a testing device and an optical reflector connected to an optical network in accordance with one or more additional example embodiments of the present disclosure.

In some embodiments, the cables, e.g., the launch cable 26 and the receive cable 28, may be single-fiber cables, each of which includes only a single optical fiber, for example as illustrated in FIGS. 5 and 6. In these embodiments, the cables will include single-fiber connectors as are understood by those of ordinary skill in the art. In other embodiments, as illustrated in FIGS. 7 and 8, the cables 26 and 28 may be multiple-fiber cables each of which includes a plurality of optical fibers. In these embodiments, the cables may include multiple-fiber connectors, such as Multiple-Fiber Push-On ("MPO") connectors.

In multiple-fiber embodiments, additional components may be included to facilitate the various connections. For example, as shown in FIG. 7, in embodiments where the cables 26 and 28 are multi-fiber cables, the testing device 10 may be connected to the MPO launch cable 26 through a multiplexer 50 and a jumper cable 52. The jumper 52 may be a single-fiber cable and the multiplexer 50 may facilitate an operative connection of the test port 14 and the single-fiber jumper 52 with the multiple fibers within the multi-fiber launch cable 26 in this embodiment.

One of skill in the art will recognize that an MPO cable is a multi-fiber cable having at least one MPO connector, and that such cables are but one example of possible multi-fiber cables usable with various embodiments of the present disclosure.

Other than the addition of the jumper cable 52 and the multiplexer 50, the configuration and operation of the testing device 10 and the optical reflector 40 shown in FIGS. 7 and 8, as well as the optical network 100 shown in FIG. 8, is generally the same as described above with respect to FIGS. 5 and 6. In order to shorten test time, N identical sets of test hardware can be used, so M fibers can be test in N groups simultaneously using N multiplexers. The multiplexers can have a ratio of at least M/N.

For example, the reference power may be obtained with the configuration depicted in FIG. 7 and may include transmitting one or more light pulses from the light source 16 of the testing device 10 to the optical reflector 40 without an optical network under test between the testing device 10 and optical reflector 40, e.g., with the testing device 10 and the optical reflector 40 connected by the launch cable 26 and receive cable 28 as described above with respect to FIG. 5, with the exception that the jumper cable 52 may be directly connected to the test port 14 and directly connected to the multiplexer 50, and the first end 25 of the launch cable 26 may be directly connected to the multiplexer 50. Accordingly, in such embodiments, the first end 25 of the launch cable 26 may be indirectly connected to the testing device 10, e.g., via the multiplexer 50 and the jumper cable 52. Thus, the reference power may be determined by measuring an optical power of one or more reflected light pulses received by the testing device 10 from the optical reflector 40 without an optical network therebetween, e.g., when the testing device 10 and optical reflector 40 are connected only by the cables 26, 28, and 52, and the multiplexer 50. In certain instances when a multiplexer is used, each branch can have a separated reference power level.

As another example, the return power may be obtained or determined using the configuration illustrated in FIG. 8 in a similar manner as described above with respect to FIG. 6. Further, the loss of the optical network 100 may then be obtained based on the reference power and the return power determined using the configurations of FIGS. 7 and 8. For example, the same mathematical relationship described above may be used, e.g., Loss of NUT=½ ·ΔP. It should be noted that the reference power and the return power used to determine ΔP are generally equivalent, such that the only change from the configuration used to determine the reference power to the configuration used to determine the return power is the presence of the optical network 100 (or at least a portion thereof) between the testing device 10 and the optical reflector 40. For example, the reference power obtained according to the configuration of FIG. 5 would be used with the return power obtained according to the configuration of FIG. 6 and the reference power obtained according to the configuration of FIG. 7 would be used with the return power obtained according to the configuration of FIG. 8.

FIG. 10 illustrates one example method 300 of testing an optical network with a testing device 10, such as an OTDR, as shown and described herein. As shown in FIG. 10, the method 300 may include a step 310 of determining a reference power. For example, the reference power determined at step 310 may be the reference power of the testing device 10 described above with reference to FIG. 5 or FIG. 7. In some example embodiments, determining the reference power may include connecting the testing device to the optical reflector, e.g., without the optical network therebetween as illustrated in FIG. 5 or FIG. 7. Determining the reference power may also include transmitting a light pulse from the light source of the testing device to the optical reflector and measuring a power level of a reflected light pulse reflected from the optical reflector to the testing device with the measurement element of the testing device, while the testing device and the optical reflector are so connected.

Turning again to FIG. 10, the method 300 may also include determining a return power through the optical network. For example, the method 300 may include a step 320 of connecting the testing device to an optical network at a first end of an optical fiber of the optical network and connecting an optical reflector to the optical network at a second end of the optical fiber opposite the first end of the optical fiber, a step 330 of transmitting a light pulse from a light source of the testing device through the optical network to the optical reflector, and a step 340 of measuring a power level of a reflected light pulse reflected from the optical reflector through the optical network to the testing device with a measurement element, such as an optical power meter, of the testing device.

The method 300 may further include a step 350 of determining a loss of the optical network based on the measured power level of the reflected light pulse and the reference power. As mentioned above, the loss of the optical network may be based on a difference of the measured power level of the reflected light pulse from the reference power. For example, the loss of the optical network may be determined by subtracting the measured power level of the reflected light pulse from the reference power and dividing the result of subtracting the measured power level of the reflected light pulse from the reference power by two.

FIG. 11 illustrates another example method 400 of testing an optical network with a testing device. The method 400 may include a step 410 of determining a reference power of the testing device based on a power level of a reflected light pulse reflected from an optical reflector, e.g., as described above with reference to FIGS. 5 and 7. The method 400 may also include a step 420 of connecting the testing device to one end of an optical fiber in the optical network and connecting the optical reflector to an opposite end of the optical fiber after the step 410 of determining the reference power. The method 400 may further include a step 430 of determining a return power through the optical network based on a power level of a reflected light pulse reflected through the optical network from the optical reflector to the testing device. Additionally, method 400 may include a step 440 of determining a loss of the optical network based on the reference power and the return power. The loss may be determined with a loss test accuracy error of less than 0.1 dB, such as less than 0.08 dB, such as less than 0.06 dB, such as less than 0.05 dB, such as less than 0.04 dB, such as less than 0.03 dB. As used herein, the loss test accuracy error may measure an amount of error resulting from the herein described method of testing the optical system. The measured return loss may be calculated by comparing the measured loss to actual loss in the optical network, e.g., as measured by a known, calibrated device such as a power meter with a separate light source. The known, calibrated device may be deployed to test the optical system by positioning the power meter on a first end of the optical system and the separate light source on the opposite side of the optical system. In certain instances, the lost test accuracy error of the loss test may be caused at least in part by an optical reflector used for performing the loss test. More specifically, the loss test accuracy error may be caused at least in part by a loss incurred by the optical reflector. It is noted that traditional loss testing performed with optical time-domain reflectors (OTDR) return optical loss test values in excess of 0.1 dB as OTDR devices are not ideally equipped to accurately measure the loss in an optical system. Moreover, traditional loss tests are performed using light sources and power meters disposed on opposite sides of the optical fiber being measured, thus requiring use of multiple devices, such as multiple active devices, e.g., a separate power meter and light source setup.

In some embodiments, the device used to perform the method 200 and/or the method 300 may be further configured to perform a length test to determine the length of one or more optical fibers in the optical network. The device may perform the trace, optical loss test, and length test all while remaining connected with the optical network, e.g., throughout each operation and without disconnecting.

In some embodiments, the device used to perform the method 300 may remain connected to the optical network between and during the step 320 of connecting the optical time-domain reflectometer to one end of the optical fiber in the optical network and the step 340 of determining the loss of the optical network based on the reference power and the return power. In this regard, the device may not be swapped with another device. In a further embodiment, the method 300 may be performed in its entirety without requiring switching of optical pathways, e.g., using an optical switch. Similarly, the method 200 may also be performed without disconnecting or swapping the OTDR or device and without using an optical switch. In such a manner, the device 10 used in accordance with embodiments described herein may include a discrete, single-unit device, i.e., not a power meter and separate light source positioned on opposite ends of the optical fiber of the optical network.

In light of the foregoing, it should be understood that the light source and measurement element arrangement used for determining the loss of the optical network in the various embodiments of the present disclosure is different from a traditional light source power meter loss measurement setup. Specifically, traditional light source power meter loss setups are capable of performing only loss tests. These traditional setups are incapable of performing, for example, event tracing testing in an optical network. Moreover, it should be understood that the device used for testing optical networks in the various embodiments of the present disclosure is different from a traditional OTDR setup as far as its optical loss detection capability and low accuracy error. Specifically, OTDR setups are incapable of measuring optical loss with low accuracy error. Thus, technicians and line operators are traditionally required to carry both light source power meter loss setups and OTDR setups when performing complex functions on the optical network. Such requirements increase cost and time of network testing. Moreover, for large optical networks, traditional light source power meter loss setups require operators on both sides of the optical fiber. The methods associated with the device described herein in accordance with one or more embodiments may be performed by a single technician. Specifically, by using an optical reflector, the technician may perform all activities associated with optical testing at a single end of the optical fiber, thereby eliminating the need for additional technicians.

Those of ordinary skill in the art will appreciate that testing methods described herein provide numerous advantages over the prior art. For example, the loss measurement methods of the present disclosure may provide a better accuracy due to the division by two in the loss calculation, which reduces any hardware impairment by a factor of two. As another example, the present methods are less dependent on the backscatter coefficient of the optical fiber as compared to traditional methods. The foregoing advantages are provided by way of example only and are not limitations of the invention, other advantages may also be provided as will be recognized by those of skill in the art.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of testing an optical system with a testing device, the method comprising:
   measuring an unloaded reference signal when the testing device is not connected to the optical system;
   storing the unloaded reference signal in a memory of the testing device;
   detecting a signal from the optical system;
   determining the optical system is connected to a test port of the testing device based on a difference between the detected signal and the unloaded reference signal; and
   automatically initiating a test of the optical system with the testing device in response to determining that the optical system is connected to the test port of the testing device.

2. The method of claim 1, further comprising waiting for a predetermined period of time after determining that the optical system is connected to the test port of the testing device before automatically initiating the test of the optical system.

3. The method of claim 1, wherein the signal comprises a reflected optical signal from the optical system.

4. The method of claim 1, wherein the signal is received by the testing device directly from the optical system.

5. The method of claim 1, further comprising continuously monitoring the test port of the testing device after measuring the unloaded reference signal until the signal from the optical system is detected.

6. The method of claim 5, wherein continuously monitoring the test port of the testing device comprises emitting an optical signal from a light source of the testing device and monitoring for a reflection of the emitted optical signal from the optical system.

7. The method of claim 1, wherein the optical system is a first optical system, further comprising:
   completing the test of the first optical system after automatically initiating the test;
   detecting the unloaded reference signal after completing the test of the first optical system;
   determining that the first optical system is disconnected from the test port of the testing device when the unloaded reference signal is detected after completing the test of the first optical system;
   detecting a signal from a second optical system after determining the first optical system is disconnected; and
   automatically initiating a test of the second optical system with the testing device in response to detecting the signal from the second optical system.

8. The method of claim 7, further comprising continuously monitoring the test port of the testing device after determining the first optical system is disconnected until the signal from the second optical system is detected.

9. The method of claim 8, wherein continuously monitoring the test port of the testing device comprises emitting an optical signal from a light source of the testing device and monitoring for a reflection of the emitted optical signal from the second optical system.

10. A testing device, comprising:
    a test port;
    a light source;
    a measurement element; and
    a controller, the controller configured for:
      measuring an unloaded reference signal when the testing device is not connected to an optical system under test;
      storing the unloaded reference signal in a memory of the testing device;
      detecting a signal from an optical system after storing the unloaded reference signal;
      determining that the optical system is connected to the test port of the testing device based on a difference between the detected signal and the unloaded reference signal; and
      automatically initiating a test of the optical system in response to determining that the optical system is connected to the test port of the testing device.

11. The testing device of claim 10, wherein the controller is further configured for waiting for a predetermined period of time after determining that the optical system is connected to the test port of the testing device before automatically initiating the test of the optical system.

12. The testing device of claim 10, wherein the signal comprises a reflected optical signal from the optical system.

13. The testing device of claim 10, wherein the signal is received by the testing device directly from the optical system.

14. The testing device of claim 10, wherein the controller is further configured for continuously monitoring the test port of the testing device after measuring the unloaded reference signal until the signal from the optical system is detected.

15. The testing device of claim 14, wherein continuously monitoring the test port of the testing device comprises emitting an optical signal from a light source of the testing device and monitoring for a reflection of the emitted optical signal from the optical system.

16. The testing device of claim 10, wherein the optical system is a first optical system, and wherein the controller is further configured for:
    completing the test of the first optical system after automatically initiating the test;
    detecting the unloaded reference signal after completing the test of the first optical system;
    determining that the first optical system is disconnected from the test port of the testing device when the unloaded reference signal is detected after completing the test of the first optical system;
    detecting a signal from a second optical system after determining the first optical system is disconnected; and
    automatically initiating a test of the second optical system with the testing device in response to detecting the signal from the second optical system.

17. The testing device of claim 16, wherein the controller is further configured for continuously monitoring the test port of the testing device after determining the first optical system is disconnected until the signal from the second optical system is detected.

18. The testing device of claim 17, wherein continuously monitoring the test port of the testing device comprises emitting an optical signal from a light source of the testing device and monitoring for a reflection of the emitted optical signal from the second optical system.

* * * * *